July 1, 1958    F. M. MAYES ET AL    2,841,011
PRESSURE MEASURING DEVICE
Filed June 19, 1956
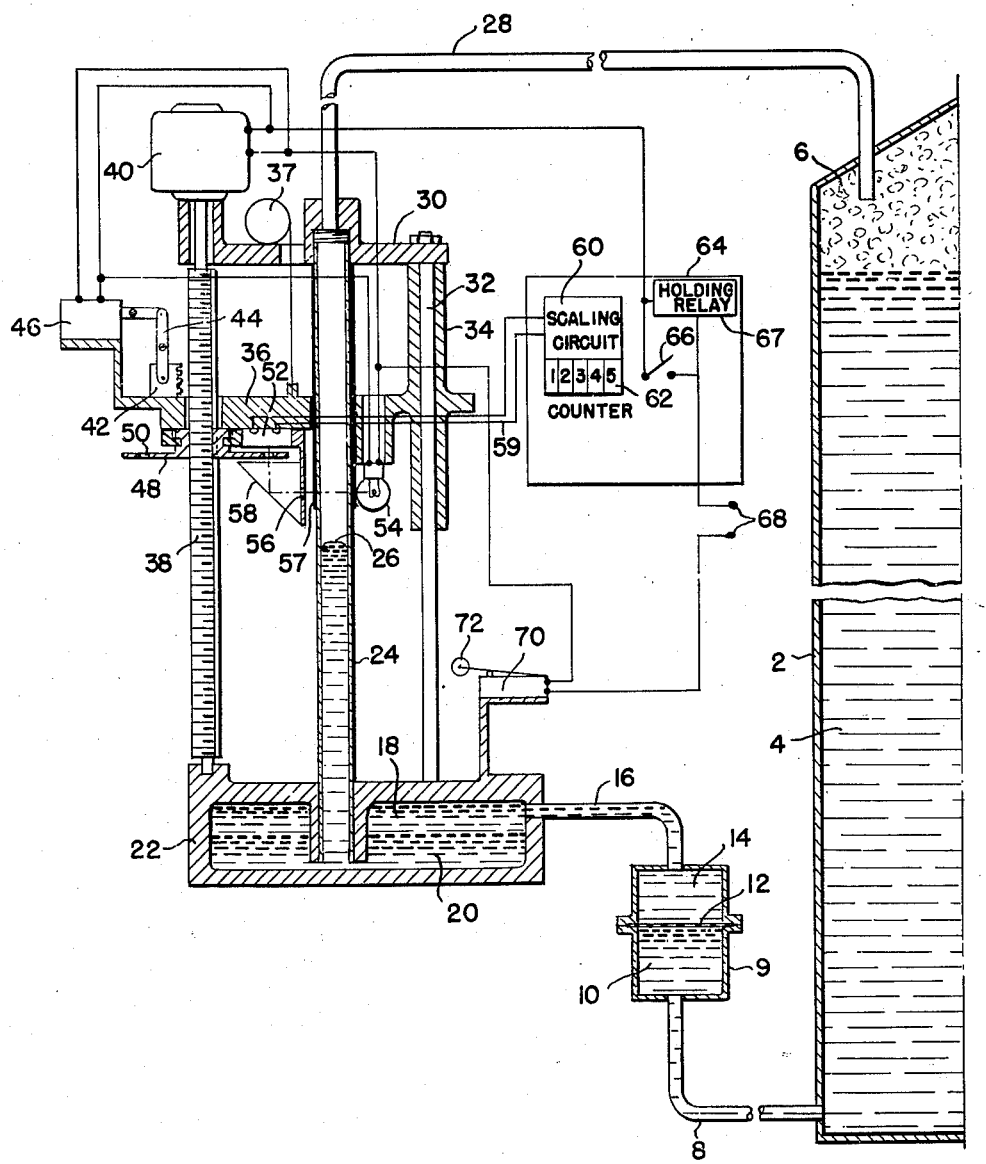
INVENTORS
FRED M. MAYES &
EINAR T. YOUNG
BY
ATTORNEYS United States Patent Office 2,841,011
Patented July 1, 1958

2,841,011

PRESSURE MEASURING DEVICE

Fred M. Mayes and Einar T. Young, Newtown Square, Pa., assignors to Sun Oil Company, Philadelphia, Pa., a corporation of New Jersey Application June 19, 1956, Serial No. 592,282

6 Claims. (Cl. 73—401)

This invention relates to a pressure measuring device and is particularly directed to the determination of quantities of liquid in tanks.

The gauging of liquids in tanks is generally accomplished by measurement of the liquid level, with the making of suitable corrections to determine actual quantity by taking into account temperature, distortion of the tank due to temperature and pressure, and other factors. For the making of automatic records, and particularly for transmission of information to a central point which may be remote from a series of tanks, as in a tank farm, various arrangements have been provided involving the use of floats. Such arrangements, however, usually entail some complications due to various considerations which arise. One of these, for example, is the matter of prevention of loss or any possibility of explosion involved in the gauging of volatile, combustible liquids. In such cases it is not permissible to have located within the tank any elements carrying substantial currents or subject to the existence of such voltages as would create sparking which may cause ignition. In the case of highly viscous liquids, difficulties are experienced in the matter of floats which may give spurious indications due to the formation of deposits of solid or semi-solid material which are usually involved in such viscous liquids.

It is one object of the present invention to provide a gauging means which is responsive to the pressure difference existing between the vapor space above a liquid and some point in the lower portion of the liquid. A manometer arrangement is provided together with precision means for measuring the height of a column of mercury or other heavy liquid in the manometer.

In accordance with the invention the measurement of the height of a column of liquid in a manometer is carried out in novel fashion to provide a high degree of accuracy of measurement, and the invention is accordingly applicable more broadly than to the measurement of liquid in a tank.

The objects of the invention relate to the attainment of the ends just indicated and will become apparent from the following description, read in conjunction with the accompanying drawing, in which the figure shows diagrammatically and in section apparatus provided in a preferred embodiment of the invention.

There is indicated at 2 a tank containing a liquid 4 above which there exists a vapor space 6. While the tank may be of open top type so that the vapor space may be open directly to the atmosphere, it will be apparent from the following description that the invention is applicable to the type of situation which gives most difficulty in gauging, namely, in which the tank is closed and in which a high pressure, or possibly a partial vacuum may exist in the vapor space 6.

Communicating at 8 with the liquid 4 at the lower portion of the tank 2 there is a container 9 which is separated by a flexible diaphragm 12 into a lower space 10 and an upper space 14. Liquid of essentially the same composition as that in the tank exists below the diaphragm 12, while above it there is provided in the space 14 an isolating liquid filling this space and a connection 16 communicating with the upper portion of an enlarged chamber 22, the isolating liquid providing therein a layer 18 above a layer of mercury or other heavy liquid. Opening below the surface of the mercury 20 there is a glass manometer tube 24 which, during operation contains a column of mercury having its meniscus located at a position such as indicated at 26. The upper end of the manometer tube communicates with the vapor space 6 through a connection 28. As will be evident from what has been described the meniscus 26 will assume a level which is a function, closely linear if suitable constructional considerations are given, to the head of the column of liquid in the tank 2. For example, if the liquid at 18 is essentially of the same specific gravity as the liquid in the tank, the column of mercury above the interface between 18 and 20 will have a height proportional to the head of the liquid 4 above that same level. For extreme accuracy it will be apparent that constructions may be adopted in well known fashions to provide automatic correction for thermal expansions of the parts involved and for differences in specific gravity of the liquid at 18 and that in the tank, etc. Due to the diaphragm 12 which is desirably slack, the liquid 4 is completely isolated from the liquid 18 and the mercury 20, the liquid 18 being of a stable type. Thus it is immaterial whether or not the liquid in the tank is corrosive, dirty, highly viscous (since the diaphragm 12 will normally move only very slightly, desirably this diaphragm having a cross-sectional area many times the cross-sectional area of the manometer tube 24) or the like.

Mounted on the chamber 22 is a supporting framework which, among other parts (not shown) includes a supporting plate 30 serving for the mounting of the upper end of the manometer tube and for the mounting of other elements as will be apparent. A guiding rod 32 forms part of the framework and on it there is mounted for sliding movement a sleeve 34 of a movable platform 36 through a vertical opening in which there passes a screw 38 mounted in suitable bearings against axial movement and arranged to be driven by a motor 40 carried by the plate 30. Under conditions in which the screw 38 is not connected to the plate 36, the plate and the elements carried thereby are raised to a position, limited, for example, by engagement of sleeve 34 with plate 30, by an arrangement which may comprise, for example, a "negator" spring arrangement 37, or a counterweight, or the like. The platform 36 has mounted thereon for sliding movement a clutch element 42 provided with threads engageable with threads of the screw 38 through the action of linkage 44 connected to the plunger of a solenoid 46, the arrangement being such that when the solenoid is energized the clutch member 42 is engaged with the screw so that rotation of the screw under the action of motor 40 will drive the platform 36 downwardly against the effort exerted by the spring 37 or its equivalent. Rotatably mounted in the platform 36 against endwise movement with respect thereto, and splined to the screw 38 so as to be rotated therewith, is a disc 48 provided near its periphery with a series of openings 50 of which there may be a considerable number. Carried by the platform 36 above the disc and aligned with the openings therein is a photocell 52 which may be of any suitable type and may have directly associated therewith amplifying means for the delivery of electrical pulses. A lamp 54 carried by the platform 36 projects light through the manometer tube 24 and a narrow slit 56 to the photocell 52 by reflection from a mirror 58. An opaque shield 57 surrounds the upper portion of the manometer tube 24 and serves to occult the illumination from the lamp 54 when the platform 36 is in its uppermost position and serves to interrupt the light until the platform 36 has moved slightly downwardly.

Connected to the photocell 52 (desirably through a pre-amplifier) as indicated at 59 is a scaling circuit 60 arranged to receive pulses from the photocell and scale these down to drive a mechanical counter indicated at 62. As will hereafter appear, for accuracy of operation it is desirable that a large number of pulses should be delivered to the scaling circuit during each revolution of the screw 38, and accordingly the scaling circuit is desirably of the known electronic type which will provide output pulses at a relatively low ratio to the input pulses, the output pulses driving the counter 62 in known fashion.

The block indicated by 64 is intended to represent a station remote from the tank and the manometer and its reading arrangement and may, for example, be a central station at which measurements are made of the heads in a large number of tanks such as occur in a tank farm. At this station there is located an operating switch 66 shunting a holding relay 67 and providing for energization from input terminals 68 of the motor 40, solenoid 46 and lamp 54, the energizing circuit including a normally closed microswitch 70 having an operating arm 72 engageable by a portion of the platform 36 when it reaches a lowermost position, thereby to open the circuit.

The operation of the device is as follows:

For a high degree of accuracy of measurement the lead of screw 38 is desirably small so that a single revolution of the disc 38 will correspond to only a small movement of the platform 36. As has already been described the meniscus 26 will assume a level corresponding to the head of the liquid 4 in the tank 2. The arrangement is such that the maximum level of this meniscus is below the lower end of the occulting shield 57. With the platform in its normal uppermost position, the switch 66 may be momentarily closed, energizing the holding relay 67 for the maintenance of energization of the circuits of the motor 40, solenoid 46 and lamp 54. The energization of the solenoid 46 forces the clutch member 42 into engagement with the screw 38 and as rotation takes place meshing will occur thereby initiation downward movement of the platform 36. For high accuracy, however, the initiation of movement is not taken as the zero position from which measurement starts, but rather, as the platform descends, there is reached very sharply the point at which illumination of the photocell 52 first occurs, i. e., the point at which the narrow slit 56 passes the lower edge of the occulting shield 57. When this occurs pulses are delivered from the photocell due to the passage of the openings 50 across the path of the light beam impinging thereon, and there starts the counting of these pulses by the scaling circuit 60 and counter 62. This continues until the light is again occulted by the meniscus 26, whereupon the counting stops. The platform 36 continues downwardly until it opens the switch 70 whereupon the entire circuit is deenergized and the platform is returned to its uppermost position by the spring 37, in readiness for another measurement cycle.

It will be evident that the number of pulses which are counted in this operation serve as a measurement of the spacing between the lower end of the shield 57 and the meniscus 26, and thus correspond to the height of the meniscus and the head of the liquid 4 in the tank. For translation of the count exhibited at 62, into head of liquid 4, various systems may be employed. Simplest, of course, is that starting the counter at a zero indication. In such case the reading may be subtracted from some value known from previous calibration. On the other hand, the counter may be made to read initially a particular figure, and then operated to subtract the pulses from that figure to give finally a direct indication of the height of the mercury column which measures the head of the liquid 4.

It will be evident that a high degree of accuracy is attainable, particularly if the lead of screw 38 is small and a large number of openings 50 are provided in the disc 48 to give rise to a large number of pulses for each rotation of screw 38. Not only may the counter 62 be read, but fractional counts may be derived, if desired, from the conventional type of signal lamps associated with the scaling circuit. Accuracy is also achieved through the use of the shield 57 as the origin for measurement. This eliminates even minor errors such as may result from initial improper engagement of screw 38 by clutch member 42, which would give rise to errors if measurement was made from the initial uppermost position of the platform 36.

It will be obvious that various changes may be made in details of construction without departing from the invention as defined in the following claims.

What is claimed is:

1. In combination, a manometer comprising a light-transmitting tube and a liquid therein, a member movable along said manometer tube and carrying means providing a beam of light traversing said manometer tube, and means effecting chopping of the beam to provide light pulses the number of which is a function of the displacement of said member, means responsive to the light pulses, and counting means operated by the last mentioned means.

2. The combination according to claim 1 in which light occulting means is fixed relative to the manometer tube and in which the counting means counts the pulses between said occulting means and the end of the manometer liquid column.

3. The combination according to claim 1 including driving means for said member and connections between the driving means and said chopping means.

4. The combination according to claim 2 including driving means for said member and connections between the driving means and said chopping means.

5. The combination according to claim 3 including means effecting a cycle of movement of said member which includes a movement by the driving means in one direction and reverse movement to its initial position.

6. The combination according to claim 4 including means effecting a cycle of movement of said member which includes movement by the driving means in one direction and reverse movement to its initial position.

References Cited in the file of this patent

UNITED STATES PATENTS

| 1,256,904 | Hurlbrink | Feb. 19, 1918 |
| 2,121,743 | Oyen | June 21, 1938 |
| 2,197,205 | Cooper | Apr. 16, 1940 |
| 2,376,459 | Stevens | May 22, 1945 |
| 2,701,854 | Carrick | Feb. 28, 1955 |